(12) United States Patent
DeJesus-Gaite

(10) Patent No.: US 9,854,819 B2
(45) Date of Patent: Jan. 2, 2018

(54) FAST SETTING ICING

(75) Inventor: Elsie DeJesus-Gaite, Wauconda, IL (US)

(73) Assignee: Rich Products Corporation, Buffalo, NY (US)

( * ) Notice: Subject to any disclaimer, the term of this patent is extended or adjusted under 35 U.S.C. 154(b) by 1690 days.

(21) Appl. No.: 11/957,973

(22) Filed: Dec. 17, 2007

(65) Prior Publication Data

US 2008/0152769 A1 Jun. 26, 2008

Related U.S. Application Data

(60) Provisional application No. 60/870,174, filed on Dec. 15, 2006.

(51) Int. Cl.

| | | |
|---|---|---|
| A23G 3/00 | (2006.01) |
| A23B 7/16 | (2006.01) |
| A23G 3/42 | (2006.01) |
| A23G 3/34 | (2006.01) |
| A23G 3/54 | (2006.01) |
| A23P 20/17 | (2016.01) |
| A23L 29/25 | (2016.01) |
| A23L 29/262 | (2016.01) |
| A23L 29/269 | (2016.01) |
| A23L 29/30 | (2016.01) |
| A21D 13/60 | (2017.01) |
| A21D 13/28 | (2017.01) |

(52) U.S. Cl.
CPC ............... *A23G 3/42* (2013.01); *A21D 13/28* (2017.01); *A21D 13/60* (2017.01); *A23G 3/0093* (2013.01); *A23G 3/54* (2013.01); *A23L 29/25* (2016.08); *A23L 29/262* (2016.08); *A23L 29/272* (2016.08); *A23L 29/30* (2016.08); *A23P 20/17* (2016.08); *A23V 2002/00* (2013.01)

(58) Field of Classification Search
CPC .......... A23G 3/0093; A23G 3/42; A23G 3/54; A23P 20/17; A23L 29/25; A23L 29/262; A23L 29/272; A23L 29/30; A21D 13/60; A21D 13/28
USPC ................................................. 426/307, 659
See application file for complete search history.

(56) References Cited

U.S. PATENT DOCUMENTS 2,693,437 A * 11/1954 Spradling ...................... 424/480
2,829,054 A * 4/1958 Feinstone ........................ 426/72
4,135,005 A * 1/1979 Cheng ............................ 426/659
4,415,601 A 11/1983 Eckel
5,158,800 A * 10/1992 Bell .............................. 426/660

(Continued)

FOREIGN PATENT DOCUMENTS

GB 2260886 A * 5/1993
WO WO 2004037231 A1 * 5/2004

OTHER PUBLICATIONS

Kuntz, "Special Effects With Gums," Dec. 1999, retrieved from the Internet: http://www.foodproductdesign.com/articles/1999/12/special-effects-with-gums.aspx.*

*Primary Examiner* — Lien T Tran
*Assistant Examiner* — Tynesha L McClain-Coleman
(74) *Attorney, Agent, or Firm* — Fay Sharpe LLP

(57) ABSTRACT

This invention provides compositions for flat icings. The compositions comprises a gum system comprising Gum Arabic, carboxymethylcellulose and optionally, Gellan gum. The composition can be used as a flat icing for baked products such as doughnuts. Also provided is a method for using the composition as a flat icing and as a glaze.

30 Claims, 3 Drawing Sheets

(56) References Cited

U.S. PATENT DOCUMENTS

| | | | |
|---|---|---|---|
| 5,230,918 A * | 7/1993 | Anderson et al. | 426/572 |
| 5,508,054 A | 4/1996 | Kretow et al. | |
| 5,571,555 A | 11/1996 | Huang et al. | |
| 5,631,034 A * | 5/1997 | Trumbetas et al. | 426/302 |
| 5,709,896 A * | 1/1998 | Hartigan et al. | 426/103 |
| 5,976,586 A | 11/1999 | Feller | |
| 6,312,751 B1 * | 11/2001 | Cain et al. | 426/607 |
| 6,368,645 B2 | 4/2002 | Huang et al. | |
| 6,902,752 B1 * | 6/2005 | Kitano et al. | 426/96 |
| 2004/0096545 A1 | 5/2004 | Hutchinson et al. | |
| 2004/0161510 A1 | 8/2004 | Hester | |
| 2006/0008575 A1 | 1/2006 | Armbrecht et al. | |

\* cited by examiner

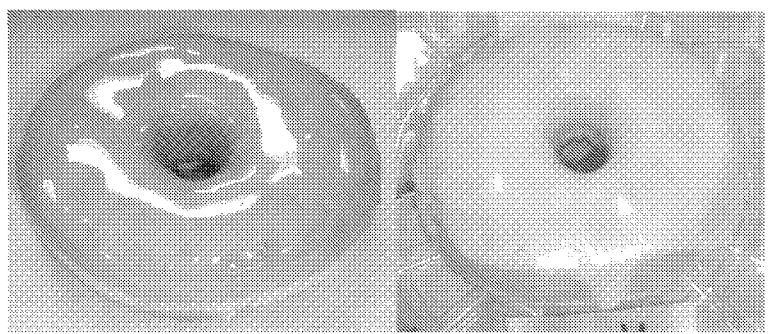
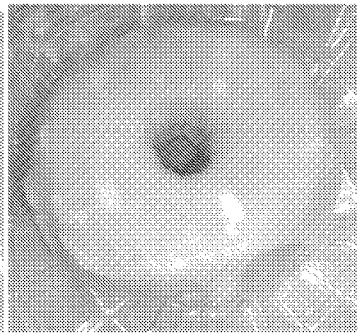
Figure 3A　　　　　Figure 3B　　　　　Figure 3C
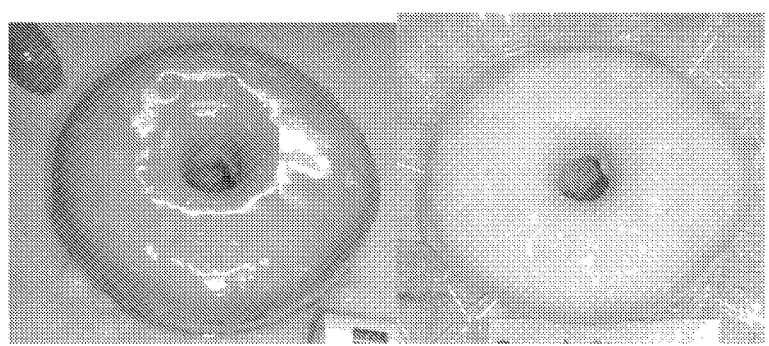
Figure 3D　　　　　Figure 3E

FAST SETTING ICING

This application claims priority to U.S. Provisional application No. 60/870,174, filed on Dec. 15, 2006, the disclosure of which is incorporated herein by reference.

FIELD OF THE INVENTION

This invention relates generally to the area of icings for foods items and more particularly to an icing formulation which is easy to use and has quick-setting properties.

BACKGROUND OF THE INVENTION

Flat icings are commonly used on baked food items to provide a desirable appearance as well as taste and flavor. These icings are not airy or fluffy in texture. Because these icings are typically applied after the product is baked and ready for consumption, the time needed to apply the icing as well as the time for it to set on the product is important—particularly in commercial settings.

Current icings on the market typically need to be warmed up and then applied to baked products such as doughnuts. For application at ambient temperatures, the current icings need to be made less viscous. However, if the viscosity of the icing composition is reduced, the setting/drying time is observed to increase. For example, it takes at least about 45 minutes, and more typically, between 45 minutes to an hour for the current icings to dry/set. This can result in significant loss of time in a commercial establishment involved in preparation and/or distribution of icing-topped baked products.

Thus, there is a need in the food industry to develop formulations for easy to use fast setting icings.

SUMMARY OF THE INVENTION

The present invention provides compositions for flat icing. The icing composition is dippable at ambient temperatures (68-80° F.) and sets in 15 minutes of less at ambient temperature. The icing composition is shelf stable at ambient temperatures and can be stored at these temperatures for at least 8 months.

The icing composition comprises sweetener solids, fat, water and a gum system comprising carboxymethylcellulose (CMC); Gum Arabic and optionally, Gellan Gum. At ambient temperatures, the composition can be used as flat icing on baked products. If heated, the composition can be used as a glaze.

BRIEF DESCRIPTION OF THE DRAWINGS

FIG. 1 shows the amount of icing needed to provide the desired opacity for a comparative composition and the present invention composition.

FIG. 3 shows that the present composition can also be used as a glaze. Following heating of the icing formulation comprising 0.248% Gum Arabic; 0.437% CMC; 0.486% Gellan Gum, a glaze can be seen to have formed for the present invention composition (FIG. 3A). The same doughnut is shown after storage in a closed plastic container for 1 day (FIG. 3B) and 2 days (FIG. 3C). A glaze can also be seen for a comparative glaze composition (comprising 0.073% Agar; 0.058% CMC) (FIG. 3D), but when stored in a closed plastic container for a day, the glaze can no longer be distinctly seen (FIG. 3E).

DESCRIPTION OF THE INVENTION

Figure 1A:
FIGS. 1A and 1B shows doughnuts having comparative icing compositions comprising 0.057% Agar and 0.262% Gum Arabic in 14.2 gms (FIG. 1A) and 22.4 gms (FIG. 1B) of icing respectively.

The present invention provides a ready to use shelf stable icing which can be used as a flat icing as well as a glaze. The icing composition is dippable and exhibits quick drying characteristics at ambient temperature (68-80° F.). In different embodiments, the icing is dippable and sets at 68, 69, 70, 71, 72, 3, 74, 75, 76, 77, 78, 79 and 80° F. In another embodiment, the icing is dippable and sets at 72-78° F. The icing composition is shelf stable at ambient temperatures and can be stored at these temperatures for at least 6 months. In one embodiment, the icing composition is shelf stable for at least 8 months.

The icing is particularly useful for doughnuts and can be applied by routine methods such as by dipping of the doughnuts into the icing. This icing when applied to doughnuts, sets within 15 minutes at ambient temperatures. The phrase "sets" is used herein to indicate a state where it is dry to the touch but can still hold decorations such as sprinkles. Those skilled in the art will recognize that if the icing is too wet, it will not keep its integrity and if it is too dry, it will not be able to hold sprinkles or other decorations.

The icing composition comprises sweetener solids, such as fondant, sugar, and corn syrup solids; water; Gum Arabic; Carboxymethycellulose; optionally—Gellan Gum; and fat. The icing composition can further comprise various additives such as colorants, flavoring agents and preservatives.

The composition of the icing comprises: at least 70% Solids (contributed by fondant, sugar, and corn syrup); 7% to 12% water; 0.1 to 1.0%, preferably 0.1% to 0.5% fat; 0.1% to 0.5%, preferably 0.1 to 0.3% Gum Arabic; 0.1 to 1.0%, preferably 0.1 to 0.5% Carboxymethylcellulose. In one embodiment, the icing composition also comprises Gellan Gum. If Gellan Gum is added, it should be in the range of 0.04% to 0.8%, preferably, 0.4 to 0.5% Gellan Gum. The viscosity of the composition is 70,000 centipoise to 90,000 centipoise at 70 to 76° F. It was found that the above combination of gums unexpectedly produced an icing having the properties described herein.

The sweetener solids can be sugar (4.5-9.5%), fondant (75-80%) and corn syrup solids (1-3%). The fats of the icing composition are preferably hard fats. Such fats include palm oil, palm kernel oil, coconut oil, babassu oil and tucum oil or various fractions thereof. In a preferred embodiment, the fat is palm kernel oil. It is preferable to use fat in the form of hard fat flakes.

In this invention, it was unexpectedly observed that by using two low strength gums, Gum Arabic and Carboxymethylcellulose the setting time for the icing was considerably reduced. The CMC is preferably of low viscosity (such as 25-30 centipoise) Consequently, the icing of the present invention sets in 15 minutes or less depending on the amount of icing used. In one embodiment, about 1 oz of the present icing is used per doughnut (regular doughnut, typically 1.8 to 2 oz) and in another embodiment, between half to one oz of the icing is used. The opacity achieved by the icing of the present invention is greater than that of currently available icings. For example, it was observed that even half an ounce of this icing has the opacity comparable to 1 oz of current icings after dipping of doughnuts into the icings. Therefore, by using the icing of the present invention, the amount needed per doughnut can be reduced. Thus for iced doughnuts, the reduced amount needed per doughnut will result in cost savings (because of needing less amounts of materials) and time savings (because of the quicker setting time), as well as healthier foods (because of reduced caloric value of the icing per doughnut).

In one embodiment, the icing comprises a combination of 3 gums—Gum Arabic, carboxymethyl cellulose (CMC) and Gellan Gum. In another embodiment, the gum system has only two gums (Gum Arabic and CMC) and no other gum. In another embodiment, the icing composition has only three gums (Gum Arabic, CMC and Gellan Gum) and no other gum. In another embodiment, the gum system consists essentially of two gums—CMC and Gum Arabic and in another embodiment, the gum system consists essentially of three gums—Gum Arabic, CMC and Gellan gum. While the use of only two gums—Gum Arabic and CMC—is required for the composition to exhibit a setting time of about 15 minutes, the addition of Gellan gum improves texture characteristics and reduces the setting time to less than 15 minutes. In one embodiment, the setting time for icing compositions when Gellan gum was also included was 10 minutes or less, generally 8-10 minutes.

This invention will provide an advantage in the preparation/distribution of doughnuts as these doughnuts can be stacked on top of each other in 5 minutes or less and the doughnuts at the bottom still retain icing integrity due to setting quickly. In one embodiment, the integrity of the stacked doughnuts is maintained for at least 1 hour. This reduces the problem of the icing of the bottom doughnuts partly disappearing when the doughnuts are stored and/or distributed in a stack. In the unstacked format, the doughnuts can be stored at 30° C. (86° F.) at 65% humidity for at least 12 hours and in one embodiment, they can be stacked for at least 18 hours.

The icing composition of the present invention can be used in icing of doughnuts in fast food establishments. For example, the composition can be heated to 100 to 125° F. so that it can be applied to doughnuts via commercial mechanical apparatus which typically require the icing compositions to the heated to these temperatures. It was observed that this icing compositions could withstand heating to temperatures of 150° F. and could be easily applied to doughnuts using the commercial equipment.

The present composition can be used for icing applications, i.e. for flat icing applications. When warmed to a temperature of 175 to 200° F., the present composition becomes thinner and then can be used as a transparent glaze on baked product such as doughnuts. Some of the characteristics of the present composition are presented below:

a. Dippable at ambient temperatures (68° F. to 80° F.).
b. For a regular doughnut (1.8 to 2.0 oz) about half an ounce of icing (from 13 to 15 gms) delivers the required opacity typical for flat icing application.
c. The icing sets in 15 minutes or less at ambient temperatures.
d. Quick drying which makes fully finished iced donuts to be stackable for an hour in a paper bag and still retains icing integrity
e. Ability to sit on the shelf under the fluorescent light set up at 1.5 ft. above the iced donuts for more than 8 hours or until the life of the donuts without melting.
f. Ability to withstand more than 8 hours in a cardboard box or until the life of the donuts
g. The composition is shelf stable (and dippable) at ambient temperatures for up to 8 months.

The icing composition of the present invention can also be used at higher temperatures. When the icing is heated to 175 to 200° F., it performs like a glaze. The performance of the glaze was better than that of current glazing compositions. When compared to a currently available glaze (comprising 0.073% Agar; 0.058% CMC), it was observed that the composition of the present invention retained the glaze after 24 hours in a plastic cover (clam shell packaging format) and even 2 days while the currently available glaze cause the doughnut to become soggy—likely due to moisture migration from the donut into the dissolved sugar crystal.

The method of making the present invention is as follows: The solids are mixed and blended. The gums are then added in and then corn syrup is added. Then the fat is added. The mixture is blended and heated to homogenously mix and is then cooled to desired temperature.

In various embodiments, different flavors can be added to the composition. For example, the flavors added include, but are not limited to Lemon, Caramel, Hazelnut, Chocolate, Strawberry, Maple, peanut and non-allergenic peanut.

EXAMPLE 1

The following formulation was used to prepare the icing with or without Gellan Gum

TABLE 1

| INGREDIENT | Without Gellan Gum | | With Gellan Gum | |
| --- | --- | --- | --- | --- |
|  | Amt in pounds | Percent | Amt in pounds | Percent |
| WATER | 157.40 | 7.59% | 157.40 | 7.59% |
| CITRIC ACID | 0.70 | 0.034% | 0.70 | 0.034% |
| SUGAR (Granular) | 190.00 | 9.164% | 190.00 | 9.159% |
| SALT -FLOUR | 2.30 | 0.111% | 2.30 | 0.111% |
| GUM ARABIC | 5.10 | 0.246% | 5.10 | 0.246% |
| CMC (low viscosity) | 9.10 | 0.439% | 9.10 | 0.439% |
| GELLAN GUM | 0.0 | 0.0 | 1.00 | 0.048% |
| HIGH FRUCTOSE CORN SYRUP | 32.00 | 1.543% | 32.00 | 1.543% |
| FONDANT | 1650.00 | 79.579% | 1650.00 | 79.541% |
| SODIUM BENZOATE | 2.00 | 0.096% | 2.00 | 0.096% |
| POTASSIUM SORBATE, Granular | 2.00 | 0.096% | 2.00 | 0.096% |
| HARD FAT FLAKES | 7.00 | 0.338% | 7.00 | 0.337% |
| MONO & DIGLYCRDS | 1.80 | 0.087% | 1.80 | 0.087% |
| CORN SYRUP | 10.00 | 0.482% | 10.00 | 0.482% |
| Titanium Dioxide | 4.00 | 0.193% | 4.00 | 0.193% |
| TOTAL | 2073.40 | 100.000% | 2074.40 | 100.000% |

The sweetener ingredients are mixed. The gums are mixed separately and then Corn syrup is added. Then the fat is added. The mix is heated to make a proper blend.

EXAMPLE 2

Tables 2 and 3 provide comparative compositions. Table 4 provides setting time for the comparative compositions. It was observed that when the icing compositions were made with the gum combinations shown in Table 2 and applied to doughnuts, the icing set in 15 minutes. However, the compositions were not shelf stable and thickened over time during storage and it became harder to dip the donuts after storage (such as after 2 hours of storage). Further, Table 3 shows icing compositions with Gums such that doughnuts were dippable at room temperature but the icing did not set within 15 minutes. Table 4 further provides performance characteristics and setting time for various gum combinations.

TABLE 2

| Gum combinations | % #1 | % #2 | % #3 | % #4 | % #5 | % #6 |
|---|---|---|---|---|---|---|
| Gum Arabic | 0.510 | 0.418 | 0.386 | 0.36 | 0.186 | 0.186 |
| Agar | 0.083 | 0.046 | 0.046 | 0.046 | 0.046 | 0.0 |
| CMC7LF | 0.090 | 0.070 | 0.0697 | 0.0697 | 0.0697 | 0.186 |
| Gellan Gum | 0.460 | 0.460 | 0.65 | 0.465 | 0.65 | 0.2 |

TABLE 3

| Gum combinations | % #1 | % #2 | % #3 |
|---|---|---|---|
| Gum Arabic | 0.093 | 0.418 | 0.35 |
| Agar | 0.0465 | 0.0 | 0.0 |
| CMC7LF | 0.0697 | 0.139 | 0.0697 |
| Gellan Gum | 0.465 | 0.465 | 0.279 |

TABLE 4

| Gum combination | Texture Characteristics | Surface Dry Time |
|---|---|---|
| 0.057% Agar; 0.262% Gum Arabic | Dippable - No heat needed | 45 minutes |
| 0.045% Agar; 0.205% Gum Arabic | Dippable - No heat needed | 50 minutes |
| 0.061% Agar | Dippable - No heat needed | 47 minutes |
| 0.083% Agar; 0.506% Gum Arabic | Dippable - No heat needed | 45 minutes |
| 0.045% Agar; 0.214% Gum Arabic | Dippable - No heat needed | 50 minutes |
| 0.099% Agar, 0.071% CMC | Difficult to dip with donut | 40 minutes |
| 0.09% Agar, 0.013% Locust Bean Gum | Needs heat to be dippable | 40 minutes |
| 0.078% Agar, 0.062% CMC | Dippable | 45 minutes |
| Fast Setting Caramel Icing - 0.244% Gum Arabic, 0.436% CMC7LF, 0.048% Gellan Gum | Dippable - No heat needed | 8 to 10 minutes |
| Fast Setting Lemon Icing 0.243% Gum Arabic, 0.424% CMC7LF, 0.048% Gellan Gum | Dippable - No heat needed | 9 minutes |
| Fast Setting Lemon Icing - 0.248% Gum Arabic, 0.437% CMC7LF, 0.0486% Gellan Gum | Dippable - No heat needed | 8 minutes |

EXAMPLE 3

This examples provides gum combinations of the present invention. These combinations produced icing formulations which set in 15 minutes or less and could be used for dipping doughnuts. The compositions of the present invention are shelf stable and can be stored (covered) at ambient temperatures for at least 8 months. In contrast, the icing compositions in Table 2, were not shelf stable and thickened over time (even when stored covered for a 2 hour storage period) and therefore required heating prior to use following storage.

TABLE 5

| | Gum Combinations (Dippable and set in 15 minutes) | | | | | | |
|---|---|---|---|---|---|---|---|
| | #1 | #2 | #3 | #4 | #5 | #6 | #7 |
| Gum Arabic | 0.200 | 0.228 | 0.243 | 0.270 | 0.300 | 0.300 | 0.200 |
| CMC7LF | 0.200 | 0.228 | 0.243 | 0.270 | 0.250 | 0.500 | 0.500 |
| | Gum Combinations (Dippable and set in 10 minutes) | | | | | | |
| | #1 | #2 | #3 | #4 | #5 | #6 | #7 |
| Gum Arabic | 0.217 | 0.244 | 0.247 | 0.243 | 0.244 | 0.246 | 0.242 |
| CMC7LF | 0.217 | 0.436 | 0.435 | 0.243 | 0.244 | 0.246 | 0.242 |
| Gellan Gum | 0.043 | 0.048 | 0.048 | 0.048 | 0.049 | 0.05 | 0.047 |
| | Gum Combinations (Dippable and set in 10 minutes) | | | |
| | #8 | #9 | #10 | #11 | | | |
| Gum Arabic | 0.241 | 0.243 | 0.243 | 0.243 | | | |
| CMC7LF | 0.241 | 0.424 | 0.460 | 0.428 | | | |
| Gellan Gum | 0.047 | 0.048 | 0.048 | 0.048 | | | |

EXAMPLE 4

Figure 1B:
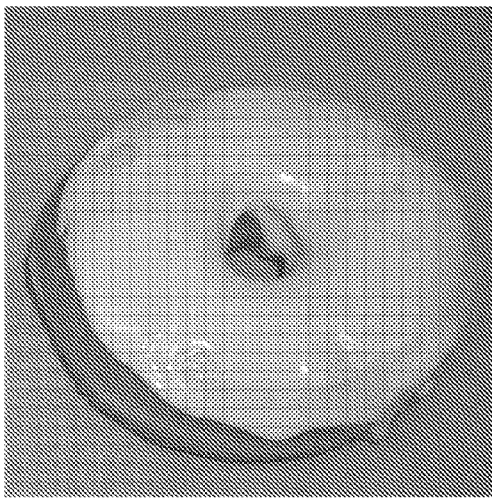
Figure 1C:
FIG. 1C shows a doughnut having an icing of the present invention comprising 0.248% Gum Arabic; 0.437% CMC; 0.486% Gellan Gum in 14.0 gms of icing. All the doughnuts weighed about the same from 59-61 grams.

This example describes the performance of icing composition of the present invention and a comparative composition. For the composition of the present invention, the gum combination was 0.248% Gum Arabic; 0.437% CMC; 0.486% Gellan Gum. For the comparative example, the gum combination was 0.057% Agar and 0.262% Gum Arabic. As shown in FIG. 1A, for the comparative composition, application of about half ounce of the composition (14.4 grams) did not result in the opacity to cover the entire upper surface of the doughnut; it took more than one and a half times that amount as shown in FIG. 1B. However, for the icing composition of the present invention, half an ounce was sufficient to provide opacity such that the entire upper surface was covered resulting in a desirable appearance (FIG. 1C).

EXAMPLE 5

Figure 2A:
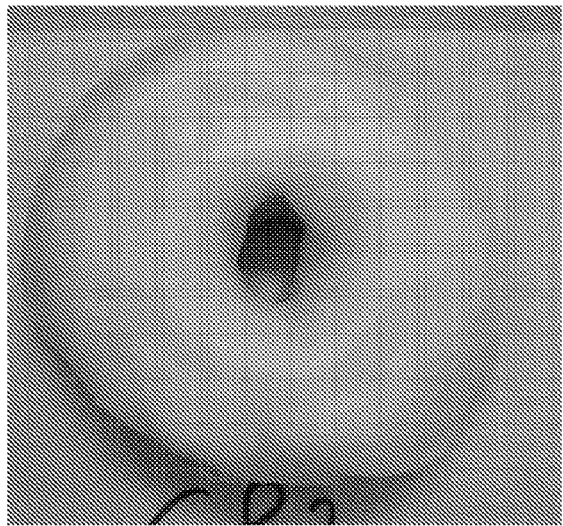
FIG. 2A shows the present invention icing (having a lemon flavor and comprising 0.248% Gum Arabic; 0.437% CMC; 0.486% Gellan Gum) on a doughnut after 2.5 days and after 1 week (FIG. 2C) showing that the integrity is still maintained
Figure 2B:
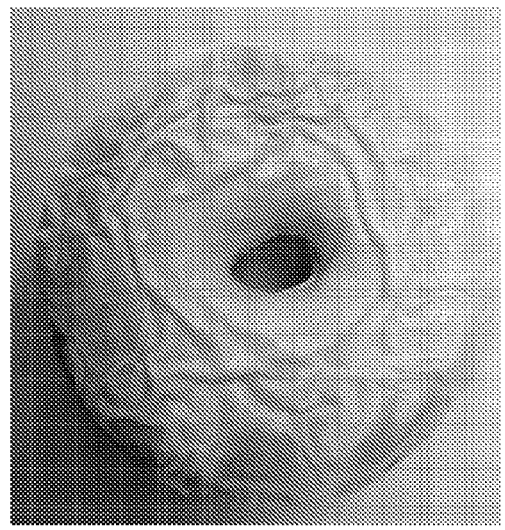
FIG. 2B shows a comparative composition (0.057% Agar, 0.262% Gum Arabic) on a doughnut after 2.5 days showing significant wrinkling of the icing.
Figure 2C:
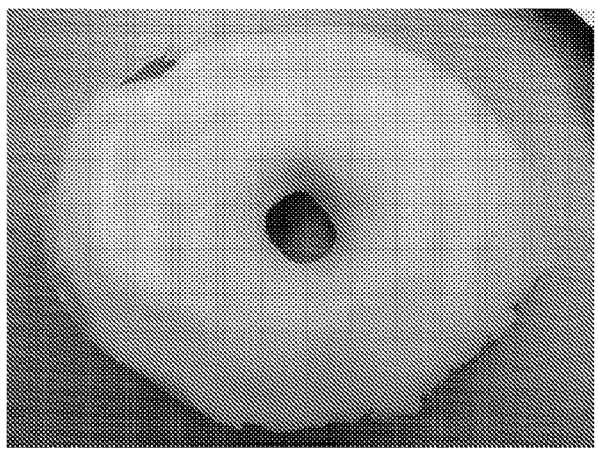
FIG. 2 shows that the integrity of the icing is maintained for several days following application.

This example describes the performance of the icing composition of the present invention and a comparative composition with respect to integrity of the applied icing. As shown in FIG. 2B, for the comparative composition, the icing was seen to be significantly wrinkled after 2.5 days, whereas the icing of the present invention (FIG. 2A) maintained its integrity after 2.5 days (FIG. 2A) and also after 1 week (FIG. 2C).

EXAMPLE 6

This example describes the application of the present composition as a glaze. For this application, the composition was warmed up to 175° F. and then applied to the doughnut. As shown in FIG. 3A, a shiny glaze is formed on the doughnut (FIG. 3A). If this doughnut is then stored in a covered plastic container (clam shell format), the glaze can still be seen after 1 day (FIG. 3B) and after 2 days (FIG. 3C). However, for a comparative glaze composition (FIG. 3D), after 1 day in the clam shell format, the glaze cannot be observed and appears to have blended into the doughnut (FIG. 3E).

While this invention has been described by providing specific examples, routine modifications will be apparent to those skilled in the art, which routine modifications are intended to be within the scope of the invention.

The invention claimed is:

1. A shelf stable flat icing for a baked product that is dippable at ambient temperature of 68°-80° F. and sets within about 15 minutes at ambient temperature of 68°-80° F., said icing composition comprises greater than or equal to 70% sweetener solids, 7%-12% water, 0.1%-1.0% fat, and gum, said gum includes 0.1%-0.5% gum arabic and 0.1%-1% carboxymethylcellulose (CMC), said icing composition has a viscosity of 70,000 cP-90,000 cP at ambient temperature of 68°-80° F.

2. The shelf stable icing as defined in claim 1, wherein said gum further includes 0.04%-0.8% gellan gum.

3. The shelf stable icing as defined in claim 1, wherein said sweetener solids includes 4.5%-9.5% sugar, 75%-80% fondant and 1%-3% corn syrup.

4. The shelf stable icing as defined in claim 2, wherein said sweetener solids includes 4.5%-9.5% sugar, 75%-80% fondant and 1%-3% corn syrup.

5. The shelf stable icing as defined in claim 1, wherein said sweetener solids is 70%-90.768% and said fat is 0.1%-0.5%.

6. The shelf stable icing as defined in claim 4, wherein said sweetener solids is 70%-90.725% and said fat is 0.1%-0.5%.

7. The shelf stable icing as defined in claim 1, wherein said gum includes 0.1%-0.3% gum arabic and 0.1%-0.5% carboxymethylcellulose (CMC), said CMC having a low viscosity of 25-30 centipoise.

8. The shelf stable icing as defined in claim 6, wherein said gum includes 0.1%-0.3% gum arabic and 0.1%-0.5% carboxymethylcellulose (CMC), said CMC having a low viscosity of 25-30 centipoise.

9. The shelf stable icing as defined claim 1, wherein said gum includes 0.04%-0.5% gellan gum.

10. The shelf stable icing as defined claim 8, wherein said gum includes 0.04%-0.5% gellan gum.

11. The shelf stable icing as defined in claim 1, wherein said fat includes palm kernel oil and is present in an amount of 0.1%-0.5%.

12. The shelf stable icing as defined in claim 10, wherein said fat includes palm kernel oil and is present in an amount of 0.1%-0.5%.

13. The shelf stable icing as defined in claim 1, wherein said shelf stable icing is absent agar.

14. The shelf stable icing as defined in claim 12, wherein said shelf stable icing is absent agar.

15. A method of applying a topping to a baked product characterized by the steps of:
    a) dipping a baked product in a shelf stable flat icing composition, said shelf stable flat icing composition including greater than or equal to 70% sweetener solids, 7%-12% water, 0.1%-1.0% fat, and gum, said gum includes 0.1%-0.5% gum arabic and 0.1%-1% carboxymethylcellulose (CMC), said shelf stable flat icing composition has a viscosity of 70,000 cP-90,000 cP at ambient temperature of 68°-80° F., said shelf stable flat icing composition is dippable at ambient temperature of 68°-80° F. and is settable within about 15 minutes at ambient temperature of 68°-80° F. ; and,
    b) allowing said shelf stable flat icing composition to set on the baked product for up to 15 minutes.

16. The method as defined in claim 15, wherein said step of allowing said shelf stable flat icing composition to set on the baked product is carried out for up to 10 minutes.

17. The method as defined in claim 15, wherein the baked product is dipped in said shelf stable flat icing composition at 72° F. to 78° F.

18. The method as defined in claim 16, wherein the baked product is dipped in said shelf stable flat icing composition at 72° F. to 78° F.

19. The method as defined in claim 15, further including the step of:
    i) heating said shelf stable flat icing composition to 175° F. to 200° F. to obtain a clear glaze liquid;
    ii) dipping said baked product in said clear glaze liquid of i); and,
    iii) allowing said clear glaze liquid to set.

20. The method as defined in claim 16, further including the step of:
    i) heating said shelf stable flat icing composition to 175° F. to 200° F. to obtain a clear glaze liquid;
    ii) dipping said baked product in said clear glaze liquid of i); and,
    iii) allowing said clear glaze liquid to set.

21. The method as defined in claim 15, wherein said gum further includes 0.04%-0.8% gellan gum.

22. The method as defined in claim 15, wherein said sweetener solids includes 4.5%-9.5% sugar, 75%-80% fondant and 1%-3% corn syrup.

23. The method as defined in claim 15, wherein said sweetener solids is 70%-90.768% and said fat is 0.1%-0.5%.

24. The method as defined in claim 15, wherein said gum includes 0.1%-0.3% gum arabic and 0.1%-0.5% carboxymethylcellulose (CMC), said CMC having a low viscosity of 25-30 centipoise.

25. The method as defined claim 15, wherein said gum includes 0.04%-0.5% gellan gum.

26. The method as defined in claim 15, wherein said fat includes palm kernel oil and is present in an amount of 0.1%-0.5%.

27. The method as defined in claim 15, wherein said shelf stable icing is absent agar.

28. The shelf stable flat icing as defined in claim 1, wherein said fat includes hard fat flakes.

29. The shelf stable flat icing as defined in claim 14, wherein said fat includes hard fat flakes.

30. The method as defined in claim 15, wherein said fat includes hard fat flakes.

* * * * *